(No Model.)

H. C. BABCOCK.
HARNESS COVERING.

No. 293,700. Patented Feb. 19, 1884.

Witnesses:
E. F. Dimock.
A. C. Tanner

Inventor:
Holland C. Babcock.
by Simonds & Burdett,
Attys

UNITED STATES PATENT OFFICE.

HOLLAND C. BABCOCK, OF HARTFORD, CONNECTICUT, ASSIGNOR OF ONE-HALF TO P. JEWELL & SONS, OF SAME PLACE.

HARNESS-COVERING.

SPECIFICATION forming part of Letters Patent No. 293,700, dated February 19, 1884.

Application filed November 17, 1883. (No model.)

*To all whom it may concern:*

Be it known that I, HOLLAND C. BABCOCK, of Hartford, in the county of Hartford and State of Connecticut, have invented certain new and useful Improvements in Harness-Coverings; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

Figure 1:
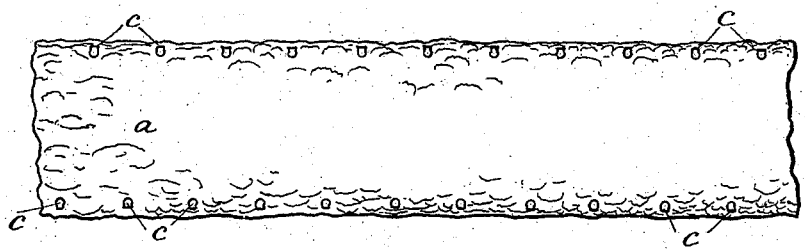
Figure 2:
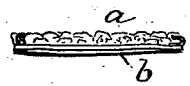
Figure 3:
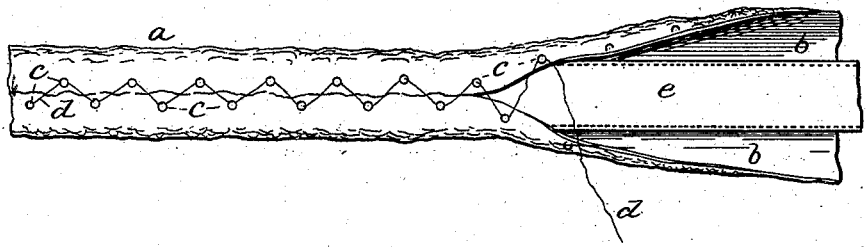

Figure 1 is a view of the outer side of my improved covering. Fig. 2 is an end view of same. Fig. 3 is a view of part of a harness, showing the method of applying my improved covering.

In the use of the breast-strap as a substitute for the collar in the harness for a horse, a covering for the part that presses most closely and rubs against the animal becomes a necessity; and the object of my invention is to provide for the harness a covering that may be readily and securely attached in any desired length. The covering is applicable as well to any and all parts of the harness where protection from chafing and bruising is needed.

My invention consists of a wool-covered harness-protector, in strips usually of considerable length, of a convenient width adapted to envelop the part of the harness to which it is to be applied, and having secured to the edges hooks, studs, or the like, so that a lacing may be used to attach the covering to the harness. The sheep-skin is backed or re-enforced by a lining of a material of greater tensile strength, that prevents the wool-covered skin from tearing under the strain of the lacing, and also serves as a body, to which the hooks or studs are secured. I prefer to use for this purpose india-rubber cloth, that also serves to protect the harness from moisture.

In the accompanying drawings, the letter *a* denotes a wool-covered material—as sheep-skin—cut into strips and sewed end to end, to form strips of any desired length; *b*, the lining or re-enforce, of material of considerable tensile strength, as india-rubber cloth; *c*, hooks or studs secured to the edges of the covering, as by sewing, or, preferably, by means of prongs that pierce the body and re-enforce and are clinched back upon the body of the hook. These hooks are so arranged along the edges of the covering that the lacing *d*, when the harness *e* is being covered, is looped back and forth alternately between the hooks on the opposite edges, which are drawn together by the lacing. The covering is applied to the harness, with the hooks and the seam formed by the union of the edges on the side from the animal, and the lacing is tied at its point of beginning and ending in any simple manner. As seen in Fig. 3, this covering is quickly and easily applied to a harness, and it may be as readily removed for cleaning either the harness or the covering.

When coverings are attached as by sewing, they serve as a means of injury as well as protection, as the difficulty of attaching them in place prevents their removal for proper drying or cleaning after use, and they are used repeatedly when hard, dirty, and damp. These difficulties are removed by my invention.

I claim as my invention—

1. As a new article of manufacture, a wool-covered harness-protector made in strips of any desired length and width, with hooks, studs, or equivalent devices secured on opposite edges, in combination with the lacing, whereby the whole is attached in place on the harness, all substantially as described.

2. In combination, the wool-covered protector *a*, the re-enforce *b*, the hooks or studs *c*, and the lacing *d*, with the enveloped harness, all substantially as described.

HOLLAND C. BABCOCK.

Witnesses:
A. C. TANNER,
E. F. DIMOCK.